Patented Dec. 5, 1922.

1,438,086

UNITED STATES PATENT OFFICE.

RAYMOND C. BENNER AND HARRY F. FRENCH, OF FREMONT, OHIO, ASSIGNORS TO NATIONAL CARBON COMPANY, INC., A CORPORATION OF NEW YORK.

HIGH-VOLTAGE COPPER-OXIDE DEPOLARIZER.

No Drawing. Application filed July 15, 1920. Serial No. 396,581.

*To all whom it may concern:*

Be it known that we, RAYMOND C. BENNER and HARRY F. FRENCH, both citizens of the United States, both residing at Fremont, in the county of Sandusky and State of Ohio, have invented certain new and useful Improvements in High-Voltage Copper-Oxide Depolarizers, of which the following is a specification.

This invention relates to depolarizers for electric batteries, said depolarizers containing copper oxide, and sulfur or its compounds.

Depolarizers such as those referred to are commonly employed at the negative electrode of cells comprising also a zinc positive electrode, and an alkaline electrolyte, such as a solution of sodium hydroxide. The sulfur or sulfur compound in the depolarizing electrode produces an increase in both the voltage and the useful life of a battery such as above instanced, as described in the patent of Raymond W. Erwin No. 1,282,057 dated October 22, 1918, and our own Patents No. 1,316,760 and No. 1,316,761, dated September 23, 1919. Prior to the invention of said Erwin, copper oxide was employed as a depolarizer without the addition of sulfur in batteries of the type mentioned above. The oxide used was the ordinary oxide of commerce, usually obtained by roasting copper scale. It was found that the addition of a sulfur-containing substance to such oxide under the conditions disclosed in the various patents cited above, would increase the average voltage of a cell during its useful life by approximately 17% under a test in which the cell was discharged at a constant rate of one ampere and the end of the useful life of the cell was taken as the point when the closed circuit voltage fell to 0.5 volt. Under these conditions, cells of a certain common size having a depolarizer of copper oxide without admixture, showed an average voltage during the discharge period of about 0.6 volt, while cells which had approximately 1.2% of sulfur suitably added to the depolarizer, gave an average of about 0.7 volt.

In our copending application Serial No. 251,029, filed August 22, 1918, now Patent No. 1,375,647, issued April 19 1921, we have shown that cupric oxide formed from electrolytically prepared cuprous oxide will give, when suitably mixed with sulfur or sulfur-containing material, a materially higher voltage than it is possible to obtain with oxidized copper scale under similar conditions. Instead of an average of 0.7 volt, the oxide of electrolytic origin gives, when the amount of sulfur added is approximately 1.2%, a value of 0.75 to 0.8 volt.

As stated in our application referred to above, copper oxide of electrolytic origin also exhibits a remarkable difference from oxidized copper scale in its behavior at low temperatures when used, in combination with sulfur, as electrode material in a battery. When roasted scale is employed with sulfur to form an electrode of a battery, and the latter is then subjected to progressively decreasing temperatures, it will be found that a sudden drop in the voltage of the battery will occur when the temperature is in the neighborhood of 15° C., the voltage falling nearly or quite to the value which would be given at the same temperature by copper oxide without the addition of sulfur. When the oxide of electrolytic origin is substituted for oxidized copper scale, there is likewise a sudden drop in voltage when the temperature is sufficiently decreased, but in the latter case the decrease does not occur until a temperature in the neighborhood of 0° C. or lower is reached.

In the process described in our above mentioned Patent 1,375,647, current is passed through an electrolyte of sodium chloride between copper electrodes. The cuprous oxide formed is collected, and may then be washed substantially free from sodium chloride and afterwards oxidized by heating in air. We prefer to oxidize the cuprous oxide at a temperature not exceeding about 350° C., although higher temperatures may be used.

In the preparation of the cuprous oxide, the concentration of the electrolyte may be, for example, 25% of sodium chloride, and the current-density may be in the neighborhood of 30 to 50 amperes per square foot of anode surface.

We have now found that copper oxide, resembling the electrolytic oxide in acquiring an extraordinarily high voltage upon the addition of sulfur and retaining this extraordinarily high voltage at temperatures approaching the centigrade zero, can be obtained by other processes. Copper oxide prepared in many different ways has been tested to determine its behavior with respect to the two phenomena mentioned. Some aspects of the action of the various samples may be explained on the hypothesis that they are mixtures in varying proportions of two varieties of copper oxide, one variety showing no abnormal activity and possibly comprising substantially the entire oxide present in oxidized copper scale, and the other variety being abnormal both as to its voltage with sulfur and the temperature at which this voltage suddenly decreases, this latter variety possibly existing in substantially pure form in copper oxide of electrolytic origin.

According to our present information, we believe samples of oxide which give, with sulfur, abnormal voltages as compared with oxidized copper scale, will also retain the increment of voltage due to the sulfur at a lower temperature than will the oxidized-scale sulfur combination. All the samples which have been tested bear out the above statement; nevertheless, we do not wish to be limited to this theory. Since the examples hereinafter given cover a variety of materials and methods of procedure which will give oxide exhibiting the abnormal voltage with sulfur and also retaining its abnormal voltage at low temperatures, these examples taken with the electrolytic process form a basis for claiming a material having either of the advantageous characteristics as our invention.

High-voltage oxide, retaining its abnormal voltage at low temperatures, may be obtained by heating chemically precipitated cupric hydroxide to a temperature sufficient to drive off its combined water. For this operation we prefer to keep the temperature as low as possible and temperatures below 300° C. have been used with good results. The hydroxide may be obtained in any usual way, as by treating solutions of copper salts, such as the sulfate, chloride or acetate, with solutions of the hydroxides of the alkaline and alkaline earth metals.

High voltage material which retains its abnormal voltage at low temperatures, can also be obtained by heating to the point of decomposition, copper compounds other than the hydroxide. The compounds which may be used in this modification appear to be, in general, those which are decomposed at moderate temperatures, for example, the carbonate, formate, acetate and nitrate. The decomposition of copper acetate, for example, may be effected at about 240° C., while the nitrate may be decomposed between 400° C. and 500° C. Copper sulfate, which is more difficultly decomposed by heating, does not give the improved material.

A particularly advantageous manner of forming the improved oxide is by the decomposition of ammonia-copper compounds in solution by heating. Solutions suitable for this purpose may be formed by treating very cheap materials containing copper, copper oxides, carbonates and the like, with solutions of ammonia or ammonium carbonate, or both. Upon heating the solution, the volatile constituents are driven off and oxides of copper, usually hydrated, are precipitated. This process of recovering copper has long been known in the metallurgical art but it was our investigations which first demonstrated that copper-oxide so obtained was far superior to the common commercial variety for the manufacture of sulfur-containing depolarizing electrodes.

It is, of course, well known as regards various metals, including copper, that certain forms of reduced metal or compounds thereof are catalytically active in various processes, as for example in the hydrogenation of oils and the like, whereas other forms do not possess substantial catalytical activity. It has not, however, proven possible to determine in advance of actual test whether or not the metal or compound produced in any given way will prove to be catalytically active. It is now regarded as possible, without thereby limiting the scope of the invention, that somewhat similar considerations may apply in the present case; and that those forms of copper oxide which are capable of producing abnormally high voltages when used in conjunction with sulfur or sulfur-bearing materials and an alkaline electrolyte, are to be regarded as catalytically active varieties.

We claim:

1. A depolarizing electrode containing sulfur and oxidized copper prepared by the decomposition of a suitable more highly oxygenated copper compound.

2. A depolarizing electrode containing sulfur and oxidized copper prepared by thermal decomposition of a copper compound.

3. A depolarizing electrode containing sulfur and oxidized copper such as may be prepared by heating an easily decomposable copper salt.

4. A depolarizing electrode containing sulfur and oxidized copper such as may be prepared by heating an easily decomposable copper compound containing ammonia.

5. As a depolarizing-electrode-forming material, an oxidized copper reduction-product characterized by its ability to give a potential at least 0.05 volt higher than is given by roasted copper scale under the same conditions, substantially as described.

6. As a depolarizing-electrode-forming material, an oxidized copper reduction-product characterized by the ability to give an abnormal voltage, as compared with roasted copper scale under the same conditions, and to retain such voltage at temperatures approaching the centigrade zero, substantially as described.

In testimony whereof, we affix our signatures.

RAYMOND C. BENNER.
HARRY F. FRENCH.